March 31, 1925.  1,531,508

A. J. ROTH

BUMPER

Filed June 30, 1924  2 Sheets-Sheet 1

Witnesses:

Inventor:
Albert J. Roth
By Joshua R. Potts
His Attorney.

March 31, 1925.
A. J. ROTH
BUMPER
Filed June 30, 1924  2 Sheets-Sheet 2
1,531,508
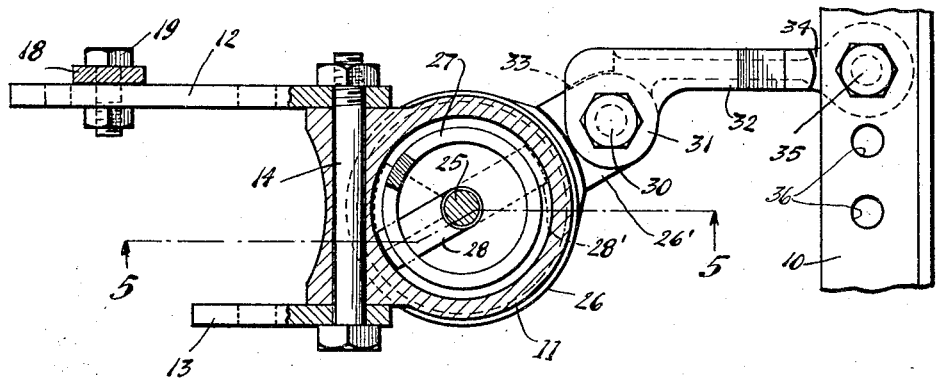
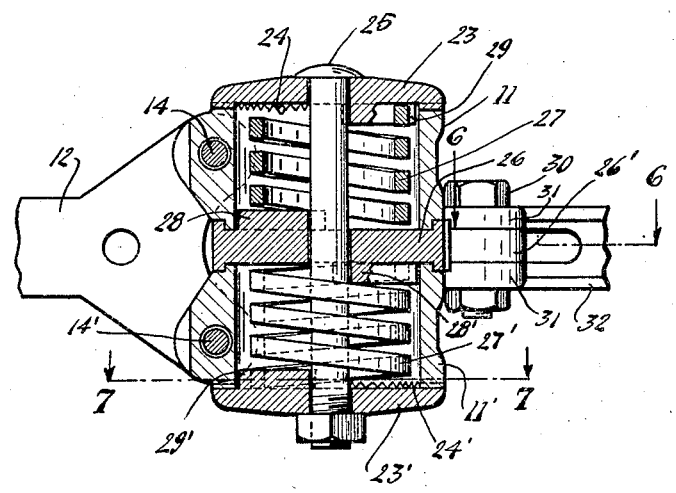
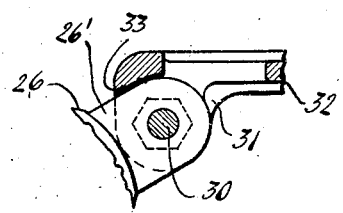
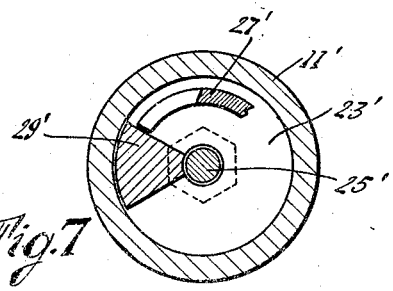
Witnesses:
Inventor:
Albert J. Roth
By Joshua H. Parr
His Attorney.

Patented Mar. 31, 1925.

1,531,508

UNITED STATES PATENT OFFICE.

ALBERT J. ROTH, OF CHICAGO, ILLINOIS.

BUMPER.

Application filed June 30, 1924. Serial No. 723,075.

*To all whom it may concern:*

Be it known that I, ALBERT J. ROTH, a citizen of the United States, and a resident of the city of Chicago, county of Cook and State of Illinois, have invented certain new and useful Improvements in a Bumper, of which the following is a specification.

My invention relates to a bumper, and more particularly to the means for resiliently mounting the bumper on an automobile or vehicle, and has for its object the provision of a bumper with strong and durable means for mounting the same on a vehicle so that it will yieldably take up and cushion the shock or impact caused by an encountered vehicle or object.

Other objects will appear hereinafter.

The invention consists in the combinations and arrangements of parts hereinafter described and claimed.

The invention will be best understood by reference to the accompanying drawings forming a part of this specification and in which, Fig. 1 is a plan view of my invention mounted in position on an automobile;

Fig. 4 is an enlarged horizontal sectional view taken on line 4—4 of Fig. 3;

Figure 1:
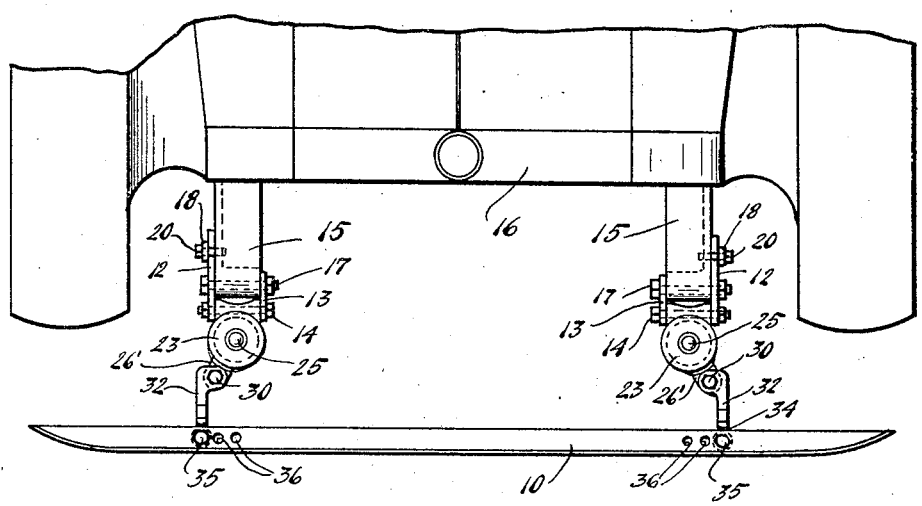
Figure 2:
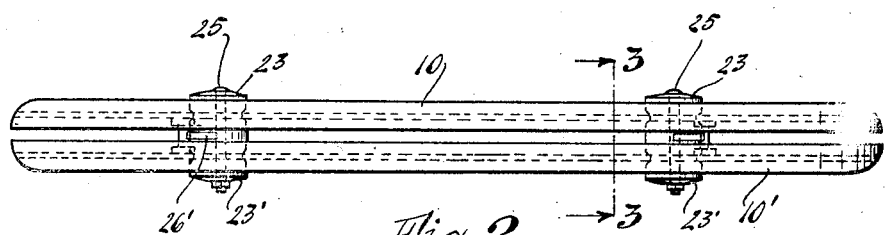
Fig. 2 is a front view of my improved bumper.

Fig. 5 is a vertical sectional view of the spring mechanism and casing, taken on line 5—5 of Fig. 4; and Figs. 6 and 7 are horizontal detail sectional views taken on lines 6—6 and 7—7 of Fig. 5, respectively.

The preferred form of construction illustrated in the drawings comprises an impact member or bumper bar preferably consisting of a pair of parallel bars 10 and 10' spaced one over the other, and preferably in the form of T-bars, and further comprises means for yieldably mounting the impact member at the front or at the rear of a vehicle, like an automobile, for effectively cushioning the impact of an encountered object or vehicle.

Figure 3:
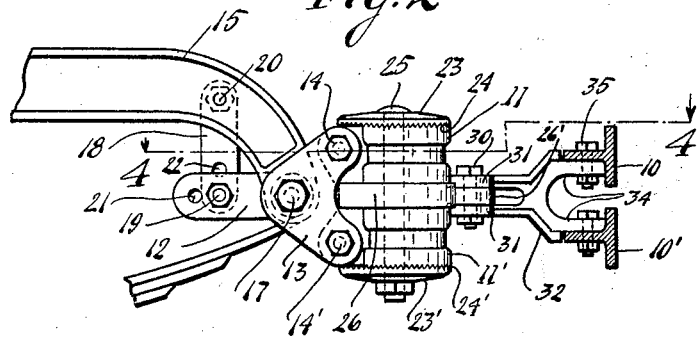
Fig. 3 is an enlarged vertical sectional view taken on line 3—3 of Fig. 2.

My improved means for yieldably mounting the impact member comprises a casing positioned adjacent each end of said member and preferably including two cylindrical parts 11 and 11' placed vertically in axial alinement, one over the other, each casing having a bracket plate 12 fastened on the outward side and a substantially triangular plate 13 on the inward side by pairs of bolts 14 and 14'. These plates 12 and 13 are fastened to the frame bars 15 of an automobile 16 by means of bolts 17 or the like, and furthermore by means of links 18 and bolts 19 and 20, the bolts 19 and plurality of openings 21 and 22 (see Fig. 3) in bracket plates 12 and links 18 enabling the two casings to be adjusted vertically. The parts 11 and 11' of each casing are provided with caps 23 and 23', at the top and bottom respectively, which are adjustably mounted thereon by means of serrations or teeth 24 or 24' and are held in fixed position by a bolt 25 and a suitable fastening nut. A disk or plate 26 is rotatably mounted between the casing parts 11 and 11', and springs 27 and 27' are mounted in said parts 11 and 11' and are seated or bear with the inner ends transversely or substantially radially of the casing against lugs or means 28 or 28' on said plate, and with the outer ends against lugs or means 29 and 29' on caps 23 and 23'. An integral arm 26' extends from plate 26 forward and outward from the casing and is pivoted by a bolt 30 to forks 31 of a link 32, and a shoulder 33 on said link limits inward movement of this pivotal connection. Each link 32 is pivotally connected at its outward end with forks 34 and bolts 35 to impact members or bumper bars 10 and 10', a plurality of openings 36 for receiving said bolts being provided in said bars to make the bumper suitable for automobiles or vehicles of different widths.

My improved bumper is mounted on the frame members of the automobile or vehicle, as indicated in Fig. 1, and when an impact or shock comes upon the bars 10 and 10', the links 32 will move the arms 31 with the pivotal connections 30 outwardly, thereby flexing the springs 27, which will gradually and yieldably cushion the shock or impact; the caps 23 providing adjustability for the tension of the springs 27, and these springs are placed slightly under tension when the device is installed on the vehicle; the device is readily assembled and mounted in position, and is very durable and effective in operation; and if desired the resilient mounting means may be reversed, the casings being securely fastened to the bumper bars, and the disc being pivotally mounted on the vehicle frame bars for horizontal swinging movement.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A bumper comprising an impact member and means for yieldably connecting it to a frame member of a vehicle, said means comprising a casing with an adjustable cap, means for mounting said casing on one of said members, a coil spring in said casing and with one end engaging means on said cap, a flat transversely extending member rotatably mounted within said casing and having a part engaging the other end of said spring, and link means for pivotally connecting said rotatable means with the other of said members.

2. A bumper comprising an impact member, means for yieldably mounting it on a frame member of a vehicle, said means comprising a pair of alined cylindrical casing parts, a bracket attached to both of said cylindrical parts, and having means for holding the case in position on one of said members, an element rotatably mounted between said cylindrical parts, a coil spring in each cylindrical part and with one end engaging a part of said rotatable element, a cap mounted on each cylindrical part and having means to engage the other end of said spring, and means for connecting said rotatable element to the other of said members.

3. A bumper comprising an impact member and means for yieldably mounting it on a member of a vehicle, said means comprising a casing with means thereon for securing it to one of said members, plate means rotatably mounted in said casing, a coil spring pressing with one end transversely of said casing against means on said plate, a cap with means pressing against the other end of said spring transversely of said casing, and means for pivotally connecting said plate with the other of said members.

4. A bumper comprising an impact member and means for yieldably mounting it on a member of a vehicle, said means comprising a casing with bracket means for securing it adjustably to one of said members, a plate rotatable with respect to said casing and having an arm extending therefrom, a coil spring bearing with one end against a lug on said plate, a cap with means bearing against the other end of said spring, means on said cap for adjustably mounting it on said casing to vary tension of said spring, and means for pivotally and swingably connecting the arm of said plate with the other of said members to flex said spring and cushion shocks coming on said impact member.

5. A bumper comprising an impact member, means for yieldably mounting it on a frame member of a vehicle, said means comprising a pair of alined cylindrical casing parts, bracket means attached to both said cylindrical parts and having means for adjustably holding them in postion on one of said members, a disc rotatable between said cylindrical parts, a coil spring in each cylindrical part and bearing with one end against a part of said disc, a cap adjustably mounted on each cylindrical part and having means to bear against the other end of said spring, and means for pivotally and swingably connecting said disc to the other of said members.

6. A bumper comprising an impact member, means for mounting it on a frame member of a vehicle, said means including a casing of two cylindrical parts axially alined, bracket plates attached to said parts for fastening them together and to one of said members, means on said plates for adjusting said casing vertically, a cap with a lug adjustably mounted on the outer end of each cylindrical part, a disc with a lug on each side rotatably mounted between said cylindrical parts, an arm extending from said disc, a coil spring mounted in each of said cylindrical parts and bearing with its opposite ends against one of said lugs on said caps and a lug on said disc, and a link pivotally engaging said arm and the other of said members.

7. A bumper comprising an impact member including a pair of parallel bars, a set of similar means mounted adjacent each end of said impact member for supporting it yieldably on the frame bars of a vehicle, each of said similar means including a casing containing two cylindrical parts axially alined, a bracket plate and a triangular plate for fastening said parts together and for mounting them on a frame bar, link and bolt means for adjusting said casing vertically on said frame bar, a cap with a lug and with serrated portions adjustably mounted on the outer end of each cylindrical part, a disc with a lug on each side rotatably mounted between said cylindrical parts, an arm extending integral from said disc, a coil spring in each cylindrical part and bearing with its opposite ends transversely of said casing against a lug on said cap and a lug on said disc, and a link with forked ends pivotally connected to said arm and also connected to the bars of said impact member to retain them in spaced relation.

In testimony whereof I have signed my name to this specification in the presence of two subscribing witnesses.

ALBERT J. ROTH.

Witnesses:
JOSHUA R. H. POTTS,
FREDA C. APPLETON.